Jan. 23, 1962 HSIN HSU WEI 3,018,447
TRANSISTOR AMPLIFIER WITH A MULTI-SECTION
ELECTROLYTIC CAPACITOR
Filed Oct. 3, 1958

WITNESSES:
Bernard R. Gieguer
James F. Young

INVENTOR
Hsin Hsu Wei
BY
ATTORNEY

United States Patent Office 3,018,447
Patented Jan. 23, 1962

3,018,447
TRANSISTOR AMPLIFIER WITH A MULTI-SECTION ELECTROLYTIC CAPACITOR
Hsin Hsu Wei, Bloomfield, N.J., assignor to Westinghouse Electric Corporation, East Pittsburgh, Pa., a corporation of Pennsylvania
Filed Oct. 3, 1958, Ser. No. 765,123
6 Claims. (Cl. 330—22)

This invention relates to transistor amplifiers, and has as objects to reduce the cost and size of transistor amplifiers.

In transistor circuits, electrolytic bypass capacitors are usually used since, due to the low voltages involved, the desired high capacities can be obtained at minimum cost. In a conventional transistor amplifier circuit using P-N-P transistors, the electrolytic bypass capacitors used have their anodes connected to the positive terminal of the associated battery. This prevents the use of the readily available, low cost, multi-section, electrolytic capacitors which have a common cathode.

This invention is a P-N-P transistor amplifier having a circuit in which two or more electrolytic capacitors having a common cathode are used as bypass capacitors. This permits the use of available, multi-section, electrolytic capacitors as bypass capacitors, reducing the cost and size of the amplifier.

This invention will now be described with reference to the annexed drawings, of which:

Figure 1:
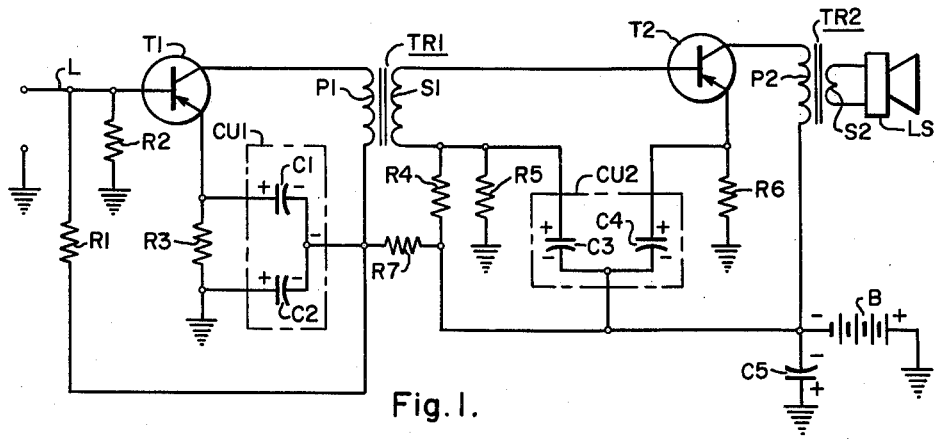
FIGURE 1 is a circuit schematic of one embodiment of this invention.

Referring first to FIG. 1, a P-N-P transistor T1 has its base connected through conductor L to a source of signals, which is not shown, supplying signals to be amplified. Its base is also connected through the usual biasing resistor R1 to one end of primary winding P1 of transformer TR1, and through the usual biasing resistor R2 to ground. The other end of the winding P1 is connected to the collector of the transistor T1. The emitter of the transistor T1 is connected through the usual stabilizing resistor R3 to ground. Secondary winding S1 of the transformer TR1 has one end connected to the base electrode of another P-N-P transistor T2, and has its other end connected through the usual biasing resistor R4 to the negative terminal of battery B, and through the usual biasing resistor R5 to ground. The emitter of the transistor T2 is connected through the usual stabilizing resistor R6 to ground. The collector of the transistor T2 is connected through primary winding P2 of output transformer TR2 to the negative terminal of the battery B. The secondary winding S2 of the transformer TR2 is connected to a loud-speaker LS. The positive terminal of the battery B is grounded. The usual bypass capacitor C5 is shunted across the battery. Decoupling resistor R7 connects the negative terminal of the battery B to the end of the primary winding P1 opposite the end connected to the collector of the transistor T1.

A conventional, two-section, electrolytic capacitor unit CU1 has its two capacitor sections C1 and C2 with a common cathode connected to the end of the decoupling resistor R7 opposite the end connected to the negative terminal of the battery B. The anode of the capacitor section C1 is connected to the emitter of the transistor T1. The anode of the capacitor section C2 is connected to ground. The capacitor section C1 is a bypass around the stabilizing resistor R3 for preventing degenerative or negative feedback. The capacitor section C2 and the decoupling resistor R7 form a decoupling filter for preventing or reducing the interaction of the output circuits of the two transistors caused by operation from the common battery B.

A conventional, two-section, electrolytic capacitor unit CU2 has its two capacitor sections C3 and C4 with a common cathode connected to the negative terminal of the battery B. The anode of the capacitor section C3 is connected to the secondary winding S1, and is a bypass for the resistor R5. The anode of the capacitor section C4 is connected to the emitter of the transistor T2, and is a bypass for the stabilizing resistor R6.

In the circuit of FIG. 1, two, two-section electrolytic capacitors replace the four capacitors previously used to perform the same functions, reducing the size and cost of the amplifier.

The circuit of FIG. 1 operates in the usual manner as a conventional two-stage audio amplifier, the transistor T1 serving as a current amplifier, and the transistor T2 serving as a power output stage. The transformer TR1 is a conventional impedance matching, coupling transformer, and the transformer TR2 is a conventional impedance matching, output transformer. The audio signals applied to the input circuit of the transistor T1 are amplified and supplied to the loudspeaker LS in the usual manner.

Figure 2:
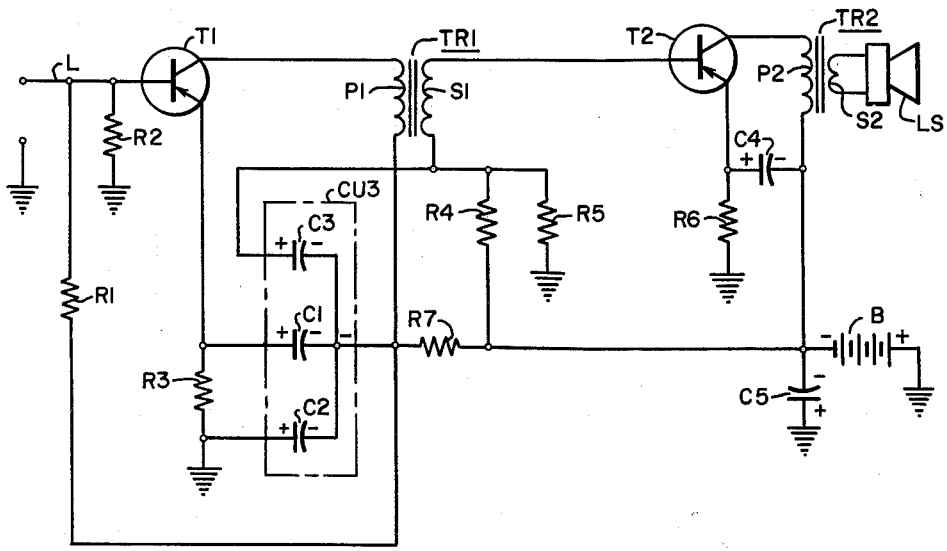
FIG. 2 is a circuit schematic of another embodiment of this invention.

In the circuit of FIG. 2, the capacitor sections C1, C2 and C3 are sections of a single, three-section, electrolytic capacitor unit CU3. The circuit of FIG. 2 is otherwise similar to that of FIG. 1 except that the anode of the capacitor section C3 instead of being directly returned to the negative terminal of the battery B, is returned through the resistor R4 to the negative terminal of the battery, and except that the capacitor section C4 is a separate, single section unit. The circuit of FIG. 2 operates in the same manner as the circuit of FIG. 1.

In the circuit of FIG. 2, one, three-section, electrolytic capacitor replaces three capacitors previously used to perform the same functions, reducing the size and cost of the amplifier.

Another advantage of the circuit of FIG. 2 is that the connection of the capacitor section C3 to the capacitor sections C1 and C2 increases the effective output impedance of the transistor T1, thereby increasing its low frequency response. Also, since the capacitor section C2 in FIG. 2 is an impedance common to both audio stages, regeneration or degeneration at low frequencies can be introduced by controlling the size of the capacitor section C2, and the polarity of the windings of the transformer TR1.

I claim as my invention:

1. An amplifier comprising a first P-N-P transistor having an input circuit connected to its base, and having an output circuit connected to its collector, a second P-N-P transistor having an input circuit connected to its base and coupled to said output circuit, said second transistor having an output circuit connected to its collector, said first transistor having a stabilizing resistor connected to its emitter and to ground, a direct current source for said transistors having its positive terminal connected to ground, and having its negative terminal connected to said output circuit of said second transistor, a decoupling resistor connected at one end to said negative terminal, and connected at its other end to said output circuit of said first transistor, a multi-section capacitor unit including a first electrolytic bypass capacitor for said decoupling resistor having its cathode connected to said end of said decoupling resistor which is connected to said output circuit of said first transistor, and having its anode connected to ground, and a second electrolytic bypass capacitor for said stabilizing resistor having its anode connected to said emitter, and having its cathode commonly connected with said cathode of said first capacitor.

2. An amplifier comprising a first P-N-P transistor having an input circuit connected to its base, and having an output circuit connected to its collector, a second P-N-P transistor having an input circuit connected to its base and coupled to said output circuit, said second transistor having an output circuit connected to its collector, said first transistor having a stabilizing resistor connecting its emitter to ground, a direct current source for said transistors having its positive terminal connected to ground, and having its negative terminal connected to said output circuit of said second transistor, a decoupling resistor connected at one end to said negative terminal, and connected at its other end to said output circuit of said first transistor, a multi-section capacitance unit including a first electrolytic bypass capacitor for said decoupling resistor having its cathode connected to said end of said decoupling resistor which is connected to said output circuit of said first transistor, and having its anode connected to ground, a second electrolytic bypass capacitor for said stabilizing resistor having its anode connected to said emitter, and having its cathode connected to said cathode of said first capacitor, a biasing resistor connected at one end of said input circuit of said second transistor, and connected at its other end to ground, a stabilizing resistor connecting the emitter of said second transistor to ground, a third electrolytic bypass capacitor for said biasing resistor having its anode connected to said end of said biasing resistor which is connected to said input circuit of said second transistor, and having its cathode connected to said negative terminal, and a fourth electrolytic bypass capacitor for said stabilizing resistor of said second transistor having its anode connected to said emitter of said second transistor, and having its cathode commonly connected to said cathode of said third bypass capacitor.

3. An amplifier comprising a first P-N-P transistor having an input circuit connected to its base, and having an output circuit connected to its collector, a second P-N-P transistor having an input circuit connected to its base and coupled to said output circuit, said second transistor having an output circuit connected to its collector, said first transistor having a first resistor connecting its emitter to ground, a direct current source for said transistors having its positive terminal connected to ground, and having its negative terminal connected to said output circuit of said second transistor, a second resistor connected at one end to said negative terminal, and connected at its other end to said output circuit of said first transistor, a third resistor connected at one end of said input circuit of said second transistor, and connected at its other end to ground, a multi-section capacitance unit including a first electrolytic bypass capacitor having its cathode connected to said end of said second resistor which is connected to said output circuit of said first transistor, and having its anode connected to ground, a second electrolytic bypass capacitor having its anode connected to said emitter, and having its cathode commonly connected to said cathode of said first capacitor, and a third electrolytic bypass capacitor having its anode connected to said end of said third resistor which is connected to said input circuit of said second transistor, and having its cathode commonly connected to said cathode of said first capacitor.

4. An amplifier comprising a first P-N-P transistor having an input circuit connected to its base, a coupling transformer having a primary winding connected at one end to the collector of said transistor, a second P-N-P transistor having its base connected to the secondary winding of said transformer, an ountput transformer having a primary winding connected at one end to the collector of said second transistor, said first transistor having a first resistor connecting its emitter to ground, a direct current source for said transistors having its positive terminal connected to ground, and having its negative terminal connected to the other end of said primary winding of said output transformer, a second resistor connected at one end to said negative terminal, and connected at its other end to the other end of said primary winding of said coupling transformer, a multi-section capacitance unit including a first electrolytic bypass capacitor having its cathode connected to said other end of said primary winding of said coupling transformer, and having its anode connected to ground, and a second electrolytic bypass capacitor having its anode connected to said emitter, and having its cathode commonly connected with the cathode of said first capacitor.

5. An amplifier comprising a first P-N-P transistor, a coupling transformer having its primary winding connected at one end to the collector of said transistor, said amplifier having an input circuit connected to the base of said transistor, a second P-N-P transistor having its base connected to one end of the secondary winding of said transformer, an output transformer having a primary winding connected at one end to the collector of said second transistor, a direct current source for said transistors having its positive terminal connected to ground, and having its negative terminal connected to the other end of said primary winding of said output transformer, a first resistor connected at one end to said negative terminal and connected at its other end to the other end of said primary winding of said coupling transformer, a second resistor connecting the emitter of said first transistor to ground, a third resistor connected at one end to the other end of said secondary winding, and connected at its other end to ground, a fourth resistor connecting the emitter of said second transistor to ground, a multi-section capacitance unit including a first electrolytic bypass capacitor having its cathode connected to said other end of said primary winding of said coupling transformer, and having its anode connected to ground, a second electrolytic bypass capacitor having its anode connected to said emitter of said first transistor, and having its cathode commonly connected with the cathode of said first capacitor, a third electrolytic bypass capacitor having its anode connected to said other end of said secondary winding of said coupling transformer, and having its cathode connected to the said negative terminal, and a fourth electrolytic bypass capacitor having its anode connected to said last-mentioned emitter, and having its cathode commonly connected to said last-mentioned cathode.

6. An amplifier comprising a first P-N-P transistor, a coupling transformer having a primary winding connected at one end to the collector of said transistor, said amplifier having an input circuit connected to the base of said transistor, a second P-N-P transistor having its base connected to one end of the secondary winding of said transformer, an output transformer having a primary winding connected at one end to the collector of said second transistor, a direct current source for said transistors having its positive terminal connected to ground, and having its negative terminal connected to the other end of said primary winding of said output transformer, a decoupling resistor connecting the other end of said primary winding of said coupling transformer to said negative terminal, a stabilizing resistor connecting the emitter of said first transistor to ground, a biasing resistor connecting the other end of said secondary winding of said coupling transformer to ground, a multi-section capacitance unit including a first electrolytic bypass capacitor having its cathode connected to said other end of said primary winding of said coupling transformer, and having its anode connected to ground, a second electrolytic bypass capacitor having its anode connected to said emitter, and having its cathode commonly connected with the cathode of said first capacitor, and a third electrolytic bypass capacitor having its anode connected to the other end of said secondary winding of said coupling transformer, and having its cathode commonly connected with the cathode of said first capacitor.

(References on following page)

References Cited in the file of this patent

UNITED STATES PATENTS

| | | |
|---|---|---|
| 2,761,916 | Barton | Sept. 4, 1956 |
| 2,762,873 | Goodrich | Sept. 11, 1956 |
| 2,762,875 | Fischer | Sept. 11, 1956 |
| 2,789,164 | Stanley | Apr. 16, 1957 |
| 2,822,434 | Ehret | Feb. 4, 1958 |

OTHER REFERENCES

Langford-Smith: "Radiotron Designer's Handbook," fourth edition, 1952, pages 191–197.